US012778092B2

(12) United States Patent
Tanner

(10) Patent No.: US 12,778,092 B2
(45) Date of Patent: Nov. 3, 2026

(54) AQUACULTURE SYSTEM AND METHOD

(71) Applicant: Three-Sixty Aquaculture Ltd, Swansea (GB)

(72) Inventor: Lee Tanner, Swansea (GB)

(73) Assignee: Three-Sixty Aquaculture Ltd, Swansea (GB)

(*) Notice: Subject to any disclaimer, the term of this patent is extended or adjusted under 35 U.S.C. 154(b) by 0 days.

(21) Appl. No.: 18/701,192

(22) PCT Filed: Oct. 12, 2022

(86) PCT No.: PCT/EP2022/078392
§ 371 (c)(1),
(2) Date: Apr. 12, 2024

(87) PCT Pub. No.: WO2023/062072
PCT Pub. Date: Apr. 20, 2023

(65) Prior Publication Data
US 2025/0000067 A1 Jan. 2, 2025

(30) Foreign Application Priority Data
Oct. 12, 2021 (GB) ...................................... 2114552

(51) Int. Cl.
*A01K 63/04* (2006.01)

(52) U.S. Cl.
CPC .................................... *A01K 63/04* (2013.01)

(58) Field of Classification Search
CPC ....... A01K 63/00; A01K 63/04; A01K 63/042
See application file for complete search history.

(56) References Cited

U.S. PATENT DOCUMENTS

2012/0097110 A1 4/2012 Tamaru
2022/0142126 A1* 5/2022 Holder ...................... C02F 3/14
(Continued)

FOREIGN PATENT DOCUMENTS

EP 0059591 A1 * 9/1982
KR 20170136274 A * 12/2017
(Continued)

OTHER PUBLICATIONS

Labatut et al. "Hydrodynamics of a Large-scale Mixed-Cell Raceway (MCR): Experimental Studies" Feb. 14, 2007, Science Direct. https://www.sciencedirect.com/science/article/pii/S0144860907000398 (Year: 2007).*
(Continued)

*Primary Examiner* — Katelyn T Truong
(74) *Attorney, Agent, or Firm* — Cook Alex Ltd.

(57) ABSTRACT

An aquaculture system, flow-through partial use and particularly a recirculating aquaculture system, for treating an aqueous stream for the farming of aquatic organisms having a containment for retaining a rotating body of water with a plurality of cells 1-4 defined within the containment, each cell being configured to hold a body of water which is rotatable within the cell, each cell being in fluid communication with at least one other adjacent cell. Large-scale aquaculture is enabled whilst retaining optimal conditions for welfare and high product quality of the farmed organisms. The system may be used in a natural body of water or as a land-based system.

20 Claims, 5 Drawing Sheets

(56) References Cited

U.S. PATENT DOCUMENTS

| | | | | |
|---|---|---|---|---|
| 2022/0201990 | A1* | 6/2022 | Liu | A01K 61/10 |
| 2023/0210095 | A1* | 7/2023 | Kiuru | C02F 1/72 119/263 |

FOREIGN PATENT DOCUMENTS

| | | | | |
|---|---|---|---|---|
| KR | 1020170135112 | | 12/2017 | |
| WO | 9004328 | A1 | 5/1990 | |
| WO | WO-9521134 | A1 * | 8/1995 | A01K 63/042 |
| WO | 9608142 | A1 | 3/1996 | |
| WO | 2020227831 | A1 | 11/2020 | |
| WO | 2021000999 | A1 | 1/2021 | |

OTHER PUBLICATIONS

Combined Search and Examination Report of the UK Intellectual Propery Office for GB Application No. 2215035.3 dated Apr. 5, 2023.

International Search Report of the International Searching Authority for International Application No. PCT/EP2022/078392 mailed on Feb. 10, 2023.

Search Report under Section 17 of the UK Intellectual Property Office for GB Application No. 2215035.3 dated Apr. 4, 2023.

* cited by examiner

AQUACULTURE SYSTEM AND METHOD

CROSS-REFERENCE TO RELATED APPLICATIONS

This is a U.S. National Stage of International PCT Application No. PCT/EP2022/078392, filed Oct. 12, 2022, which claims the benefit of and priority to Great Britain Application No. 2114552.9, filed Oct. 12, 2021, the disclosures of which are hereby incorporated by reference in their entireties.

This invention relates to an aquaculture system, particularly to a contained vessel, and to a method of farming aquatic organisms in an aquaculture system and particularly to a recirculating aquaculture system a flow-through system and a partial-flow system using seawater, freshwater or brackish water.

Aquaculture or aquafarming is a controlled process of cultivating aquatic organisms, for example, fish, crustaceans and shellfish, and may also be used for a variety of purposes including managing habitat and in regeneration of wild populations of aquatic organisms. Aquaculture may be carried out in a range of salt water, fresh and brackish water environments depending on the organisms under cultivation. Large-scale tanks, typically circular in cross-section, are commonly employed and find extensive use in the commercial production of fish and other aquatic organisms for the food sector.

As the human population continues to grow rapidly and demand for sustainable, environmentally friendly, high quality protein grows accordingly, the demand for fish and other organisms produced by aquaculture is expected to grow markedly in the coming years.

Conventional aquaculture systems may be of the recirculating type in which water inflow and outflow is retained within a closed system, flow-through type in which water is generally used once; net pen aquaculture systems are located within in a body of water, for example a loch, lake or sea environment, and are open to the environmental conditions, floating closed containment systems are also known wherein water from the body of water is brought into the aquaculture system and discharged from the system back into the external body of water. Partial flow-through or re-use aquaculture systems in which a higher percentage of water is discharged and the remaining water is treated and reused are also known. Recirculating aquaculture systems typically involve provision of large-scale water tanks equipped with filtration, internally or externally to recirculate and to treat the water for reuse and careful control of water conditions to optimise growth of the aquatic organisms. Water enters the tank through an inlet, and exits the tank via an outlet to then be treated and recirculated to the tank. Typically, tanks have an outlet or multiple outlets through which water-containing biosolids may pass and thereby be removed from the body of water in the tank.

Fish swim-speed, water velocity, oxygen levels, water residence time, removal of waste such as biosolids, CO2 and maintenance of appropriate water quality are important factors to control and inter-related. The rate and method of inflow and outflow of water to the system determines the flow distribution of the body of water in the tank and aims to promote uniform mixing, delivery of oxygenated water and rapid removal of biosolids. Flow velocities within the tank also must be controlled to enable an optimal fish swimming-speed. Where the fish's swimming-speed is too low, the fish may develop fat, be under-exercised, adversely affecting the quality and welfare of the fish thus reducing system efficiency. Where fish swimming-speed is too high, the fish require greater levels of food to provide additional energy, raising costs and impairing the quality of the fish which may result in fatigue, liver damage, skin lesions, increased blood cortisol, aggressive behaviour and competition for lower velocity water. Flow velocities therefore need to be controlled within certain limits to ensure appropriate swimming-speeds.

A larger tank generally requires a higher flow velocity to maintain a given level of oxygenation and rate of waste removal. This generally imposes an upper limit on size of tank in a recirculating system, typically around 30 m diameter and 10 m deep due to the need to avoid the flow velocity being too high for the optimal swim-speed of the aquatic organisms. This in turn sets an upper limit for the yield of aquatic organisms per volume of tank and hence the economic return.

Mixed-cell raceways are known which combine aspects of linear raceways and circular tanks to overcome drawbacks of linear raceways, for example high rates of reuse with risk of disease transmission and increased mortality.

WO2020/227831 describes a mixed-cell raceway device in which virtual circularly cross-sectioned cells are disposed along a longitudinal axis of a tank with water being fed in and removed at opposite ends of the longitudinal tank. WO96/08142 describes a system which combines the linear race-way system with aspects of circular tanks and comprises two side-by-side longitudinal tanks formed by two longitudinal outer walls and a central longitudinal wall with each longitudinal tank being divided into square cells by flow deviators which constrict the corners of the square. Each cell has a vertical outlet pipe for removal of water. WO90/04328 describes a multi-zone system in which water enters each zone and leaves the zone through a drain located centrally in the zone.

We have now devised a novel aquaculture system and method in which larger tanks may be employed whilst ensuring appropriate operating conditions i.e. oxygenation, waste removal and conditions such as flow velocity for the aquatic organisms under cultivation by providing distinct compartmentalisation of cells within the tank in which local conditions may be controlled whilst retaining fluid communication between the cells within the tank whereby the cultivated organisms may pass between cells. By providing connected cells, residence time and flow speed may be managed based on the cell volume whereas the cultivated organisms may pass between cells whereby a larger aquaculture system may be provided whilst ameliorating the drawbacks which limit the size of conventional systems.

The aquaculture system of the invention also enables supply and withdrawal conduits and other service conduits and ancillary engineering to be shared between the cells, providing improved yield of farmed organisms for a given footprint or surface area and reduced capital and operating costs for a given yield as compared to conventional systems.

In a first aspect, the invention provides an aquaculture system for supporting aquatic organisms, comprising:

a containment for retaining a body of water to provide habitat for the aquatic organisms and comprising a plurality of cells defined within the containment, each cell being configured to hold a body of water which is rotatable within the cell, each cell being in fluid communication with at least one other adjacent cell;

at least one inlet for receiving water into each cell configured to allow the body of water in that cell to be rotatable;

at least one outlet, preferably one outlet in each cell, for removing waste from the aquatic organisms and water from the containment.

Suitably, in all aspects of the invention described herein the at least one outlet comprises a waste outlet in each cell and a water outlet for egress of water from at least two cells and preferably all of the cells. The aquaculture systems and method according to the invention therefore suitably comprise a waste outlet in each cell and at least one water outlet wherein the or each water outlet receives water from two or more cells and preferably from all of the cells.

Suitably, the cells are configured in an arrangement to enable the water outlet to receive water from at least two and preferably all the cells at a location adjacent to two or more cells. The water outlet may be located at a boundary of two or more cells. Suitably, the cells and water outlet are configured such that the water outlet is generally centrally located between the plurality of cells.

Suitably the waste outlets in the system receive not more than 30%, preferably not more than 20%, more preferably 2 to 10% of the flow within the cell. Suitably, the one or more water outlets receive at least 70%, preferably at least 80% and more preferably from 90 to 98% of the flow from the system. The flow which exits the system through the waste outlets suitably comprises at least 80%, preferably at least 90%, especially at least 95%, for example more than 99% of the solids waste in the system and a minor proportion being water. Suitably, the flow leaving the system through the at least one water outlet is over 90%, preferably at least 95%, especially at least 99% water.

Preferably, the water outlet(s) comprise a weir wherein water leaves the system via the water outlet at a point vertically disposed from the bottom of each cell to reduce biofouling and to enable cost effective engineering, construction and maintenance.

The terms “tank” and “containment” are employed interchangeably herein to mean the same thing.

The aquaculture system and method of the invention may be employed as a recirculating system, a flow-through system and as a partial flow-through system. In a recirculating system and a partial flow-through system, a treated aqueous stream is suitably delivered to the containment.

In a recirculating system, the body of water is constantly recycled within the system which is generally closed, although excess water may be removed from the system or water from outside the system be fed to the system as required; suitably such additional water is less than 10% of the volume of water in the containment, preferably less than 5% and especially less than 1% by volume per day. An aquaculture system according to the invention suitably comprises a conduit for recirculating water from the at least one outlet to the at least one inlet. Water which is recirculated in the system of the invention is suitably treated for example to remove waste, to replenish with oxygen, nutrients or the like, or subjected to disinfection such as UV irradiation and ozone disinfection.

In a flow-through system according to the invention, the system is suitably adapted to be located within a natural body of water, for example the sea or a lake, in which water inflow from the surrounding external body of water and outflow to the body of water is pumped under controlled conditions. Water is received from an external body of water, resides within the aquaculture system for a period of time and then discharged from the system back into the external body of water, preferably the majority of solids are captured and removed for disposal.

In one embodiment of a flow-through system according to the invention, where the containment is land based it may comprise at least in part a filter enabling passage of water between the volume contained by the containment, and the external body of water. The filter may act as the inlet for water from the external body into the containment and also act as the outlet for water from the containment to the external body of water. A separate outlet is also suitably provided to allow managed removal of solids material or waste from the aquaculture system so as to reduce and, preferably avoid significant deposits of solid material into the external body of water.

In a second aspect, the invention provides an aquaculture system for treating an aqueous stream for supporting aquatic organisms, comprising:

a containment for retaining a body of water to provide habitat for the aquatic organisms and comprising a plurality of cells defined within the containment, each cell being configured to hold a body of water which is rotatable within the cell, each cell being in fluid communication with at least one other adjacent cell;

at least one inlet for receiving water into each cell;

at least one outlet in each cell for removing waste from the aquatic organisms and water from the containment; and water rotation means adapted to rotate the body of water in each cell.

As noted above, suitably the at least one outlet comprises a waste outlet in each cell and a water outlet for egress of water from at least two cells and preferably all of the cells. In a third aspect, the invention provides a recirculating aquaculture system for treating an aqueous stream for supporting aquatic organisms, comprising:

a containment for retaining a body of water to provide habitat for the aquatic organisms and comprising a plurality of cells defined within the containment, each cell being configured to hold a body of water which is rotatable within the cell, each cell being in fluid communication with at least one other adjacent cell; at least one inlet for receiving water into each cell, configured to enable the body of water in that cell to be rotatable;

at least one outlet for removing waste from the aquatic organisms and water from the containment; and a conduit for recirculating water from the at least one outlet to the at least one inlet.

Suitably, in the aquaculture system of the third aspect of the invention the at least one outlet comprises a waste outlet in each cell and a water outlet for egress of water from at least two cells and preferably all of the cells.

In a further aspect, the invention provides a method of farming an aquatic organisms in an aquaculture system comprising:

i) providing an aquaculture system for farming aquatic organisms, comprising:

a containment containing a body of water comprising a plurality of cells defined within the containment, each cell holding a portion of the body of water and each cell being in fluid communication with at least one other adjacent cell;

at least one inlet for introducing water into each cell;

at least one outlet in each cell for removing waste from the aquatic organisms and water from the containment;

ii) rotating the body of water in each cell in a horizontal plane at a pre-determined angular velocity suitable for the aquatic organisms;

iii) providing feed for the aquatic organisms;

iv) removing waste from each cell via the outlet in that cell.

Suitably, the at least one outlet comprises a waste outlet in each cell and a water outlet for egress of water from at least two cells and preferably all of the cells. In a recirculating aquaculture method, the method further comprises the step of recirculating the water removed from the containment to at least one inlet.

In a flow-through aquaculture method, water is introduced to each cell from an external body of water. The water in the containment leaves the containment and passes into the external body of water. The system is configured and operated so as to be able to control the residence time of the water in the containment to the desired residence time for the particular organisms being farmed. The inlet and/or outlet may comprise a filter or mesh to allow passage of water between the external body of water and the containment. The water may be rotated by separate rotation means, preferably in each cell, or by directing the flow of water into the cells.

The aquaculture system of the invention may be used to farm fish or crustaceans.

Advantageously, the invention enables sustainable rearing of aquatic organisms, especially high-value finfish for local and export markets. The system enables the organisms to be farmed within each cell and allows for movement between them via gaps in the walls defining the adjacent cells. This ensures oxygenation is maintained, waste removal, flow velocity controlled providing a novel way of operating a aquaculture system in a novel way in order to improve water quality.

The invention provides increased fish welfare and offers greater control over the rearing conditions to increase productivity of high-quality healthy fish. Additionally, the large fish tanks will benefit from economies of scale and therefore increase productivity, profits and competitiveness. Providing a water supply to multiple cells in closer proximity and the removal of water from multiple cells the invention allows the use of fewer water supply and removal systems, preferably a single water supply and removal infrastructure for all of the cells within the containment, provides capital and operating efficiencies, this reduces the complexity of the water supply and removal and enables a lower specification for pumping of water to be employed, reducing pressure head losses.

The system according to the invention provides, in preferred embodiments, internal features that will produce faster intermittent currents in a novel manner, increased water quality, delivery of additional oxygen at peak requirements and increased swim speed for short periods of time, improving fish health and welfare.

Suitably, each cell in the containment is of a generally circular, polygonal or part circular, part polygonal shape, preferably octagonal, dodecagonal or hexadecagon, circular in whole or part or comprising part walls which present a polygonal and part circular wall to the cell.

The containment comprises at least 2 cells, preferably at least 3 cells, more preferably 4, cells. The containment may comprise as many cells as desired and may comprise a large array of cells depending on the capacity requirements for the system. For example, the containment may comprise an array of cells comprising at least 8 cells, at least 20 cells, at least 50 or at least 100 cells preferably arranged in sets of 4.

Suitably, the containment comprises a base, a peripheral side wall and internal walls located so as to define the plurality of cells within the containment. Preferably each cell is shaped such that a body of water in the cell is rotatable within the cell, the cell being defined by internal walls, optionally a portion of the peripheral wall and at least one space in the walls to enable fluid communication with an adjacent cell. Each cell is defined by a portion of the peripheral wall, with at least two internal walls extending from the peripheral wall towards the inner area of the containment, and a further wall which extends to the two internal walls with a space between the further wall and the internal walls.

Preferably, the further wall for each cell is provided by an adjacent tank or preferably a structure comprising a water outlet. The structure is suitably located between two or more cells and, preferably is located generally in the centre of the containment. The structure may further comprise means for supply to the containment of water and optionally other components, for example oxygen, nutrients and the like and for removal of water, waste and optionally other components from the containment. The structure suitably comprises a conduit for the supply of water to each of the inlets, preferably an inlet in each cell. The inlet may comprise one or more nozzles, preferably 2 to 10 nozzles, for example 6 nozzles for a 7 m containment and suitably, the number of nozzles is selected according to the size of the containment The inflow of water through the inlets imparts force to the body of water within the cell and thereby rotates the body of water within that cell. The structure suitably provides an outlet for water and/or waste from one or more cells. and may also provide a means of ingress and egress of other materials.

Preferably, the structure is configured to enable outflow of water from the containment. In a preferred embodiment, the structure comprises a weir enabling outflow of water from each cell. Suitably, the weir is at height such that of the outflowing water in the containment, at least 50%, preferably at least 80%, especially at least 95% of the water is removed from the containment via the weir. The balance of the water is suitably removed from the containment by other means which may comprise a conduit or drain for the removal of water from each cell via the outlet, for example the waste outlet in each cell. Optionally, the structure comprises means of feeding a component to and/or removing a component from the system/, for example oxygen, nutrients and the like.

In a preferred embodiment, the outlet comprises a dam to permit flow of water from the cells into the structure comprising the water outlet. In a preferred embodiment, the structure is located centrally in the containment with the cells arranged around the structure such that water may flow from each cell into the structure via a weir.

Suitably, the floor of the cell, preferably of each cell comprises an outlet which may comprise an aperture or conduit, for the removal of waste and mortalities from each cell. A proportion of the water, not removed via the structure, is suitably removed via the outlet. The floor may be level or comprise areas or the whole of the floor sloping radially downwards from the periphery of the cell towards a low point in the middle area of the cell, for example the centre of the cell, whereby solids are settled at the bottom and are urged under gravity and the centripetal force generated by the rotating water to the outlet for removal.

Preferably, the outlet comprises an aperture in the base of the containment in each cell which acts as a conduit for the removal of waste, water, uneaten feed and mortalities.

Preferably, the plurality of cells are disposed in a tessellated arrangement relative to each other. In an alternative embodiment, the plurality of cells are disposed longitudinally.

In an especially preferred embodiment, the containment comprises 4 cells wherein the cells are arranged such that the cells are in a generally square arrangement. Suitably, each cell's peripheral wall is generally of constant radius whereby the containment has a generally quatrefoil shape.

Suitably, the inlet for each cell is located so as to enable rotation of the body of water in that cell at a rate and direction substantially independently of the rate and direction of the body of water in the other cells. Suitably, the inlet comprises a plurality of nozzles or other means defining an aperture to allow passage of water therethrough into the cell, for example slots. The term "nozzle" is employed herein to refer to any means defining an aperture or inlet for water to pass into the cell, suitably in a controllable direction providing impetus to rotate the body of water in the cell. The inlet in each cell may comprise a plurality of nozzles located at or near one or more of the cell walls and aligned to provide a flow of water into the cell in a circumferential direction thereby to impart force to rotate the body of water in the cell.

In a preferred arrangement, the inlet comprises a plurality of nozzles aligned in a horizontal array and/or comprises a plurality of nozzles arranged in a vertical array. Suitably, the nozzles extend from a vertical axis and are orthogonal to each other. The inlet preferably comprises at least 3 nozzles wherein the nozzles are independently arranged at an angle of 0 to 45° relative to the cell wall adjacent to the nozzle. Preferably, adjacent nozzles are arranged at an angle of 90 to 22.5 degrees in the horizontal, relative to adjacent nozzles, when viewed in a vertical direction. Suitably, the inlets are located such that the body of water in a cell is rotatable in the opposite direction to the body of water in an adjacent cell.

Suitably, less than 10%, preferably less than 5%, more preferably less than 1%, particularly not more than 0.2% and, especially minimal mixing occurs between the body of water within one cell with that of an adjacent cell, the percentage being based on the volume of water within one cell. For example, in a containment of 35 to 40 m diameter comprising four cells arranged in a square, with the cells being generally circular or of regular polygon shape such that the cells are of the order of 17.5 to 20 m diameter and approximately 5 m deep, the fluid pathways between adjacent cells and the rate of rotation of the body of water in the cells is such that suitably less than 0.5% mixing occurs, for example less than 2000 litres per minute of water mixes between adjacent cells with a cell volume of 2 million litres.

The water within a cell suitably remains substantially within that cell and is rotatable in the opposite direction to the body of water in an adjacent cell. The residence time of a body of water in a cell is influenced by the size of the cell. Suitably, for a cell of 2 to 4 m diameter or maximum dimension of 4 to 8 m the residence time of the body of water in the cell is of the order of 12 to 20 minutes, larger cells, for example a cell of 12 to 20 m diameter may have a residence time of 30 to 60 mins. For even larger cells, greater than 20 m diameter, 30 to 40 m, a residence time of the order of 80 to 120 minutes may be optimal. The maximum swim speed suitable for the organisms being farmed will determine the maximum rate of rotation and inflow of water which determines the residence time for a given tank size and optimal swim-speed. These factors are suitably selected having regard to the type of organisms being farmed, the stocking density of the organisms, the size of the fish and their optimal swim speed to ensure appropriate fish welfare and quality. Where the aquaculture system is employed for farming crustaceans, the swim-speed may be a less significant factor than when farming fish, allowing larger containment sizes, for example a containment of 100 m diameter may be employed with a residence time of 2 to 3 hours.

The invention provides an aquaculture system according to the invention wherein the containment has one and preferably two orthogonal dimensions of at least 1 m, preferably at least 5 m, more preferably at least 7 m. The containment is suitably not more than about 75 m maximum dimension, preferably not more than about 50 to 60 m. Preferably, the containment has a minimum dimension from 3.5 m to 20 m, for example 7m and 40 m. The system and method of the invention suitably enable the flow rate of water through the at least one inlet to be controlled such that the velocity of the rotatable water is from 1 to 3, preferably 1.5 to 2.5 and more preferably 1.8 to 2, times the body length of the aquatic organisms per second being cultured with the containment.

The invention is illustrated below with reference to the accompanying drawings in which.

Figure 1:
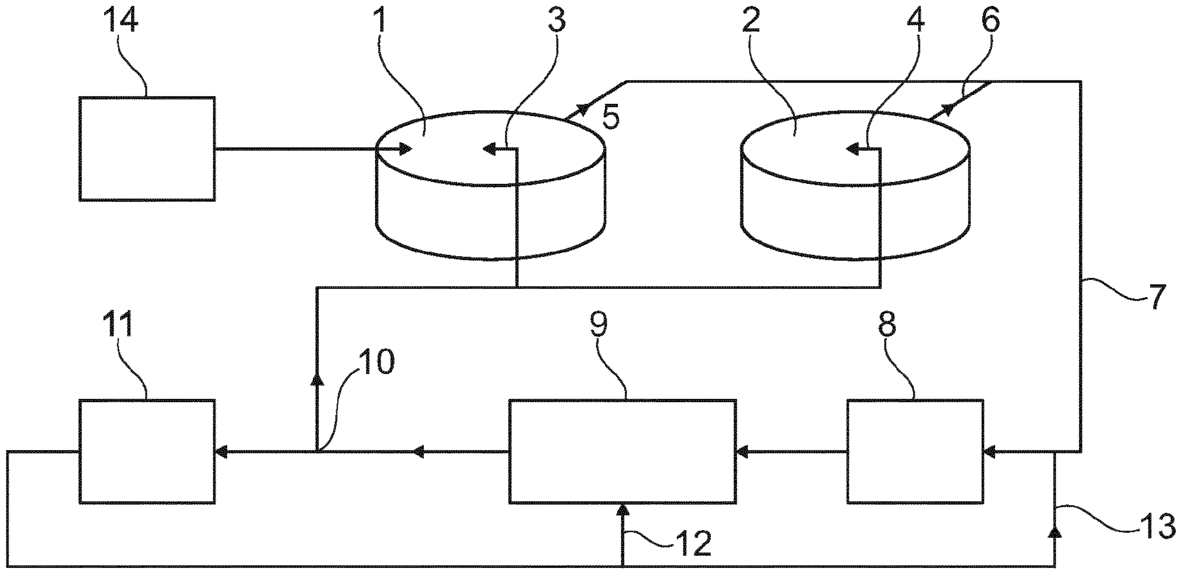
FIG. 1 shows a schematic view of a conventional recirculating aquaculture system.

FIG. 1 shows a conventional recirculating aquaculture system having two tanks (1, 2) for farming aquatic organisms. Water is fed to the tanks (1, 2) via inlets (3, 4) and the water rotates within the tanks. Water is removed from the tanks via outlets (5, 6) and waste is removed (not shown) with the removed water being recirculated via line (7) to the supply infrastructure including oxygen control vessel (8), pumping stations (9) and is then fed back to inlets (3, 4). The water flow is split at junction (10) such that a proportion of the recirculating water is passed to biofilters (11) and recycled via lines (12, 13) to the supply infrastructure. Each rotating body of water is in discrete tanks (1, 2), each tank requiring its own inlet (3, 4) and outlet (5, 6) systems.

Figure 2:
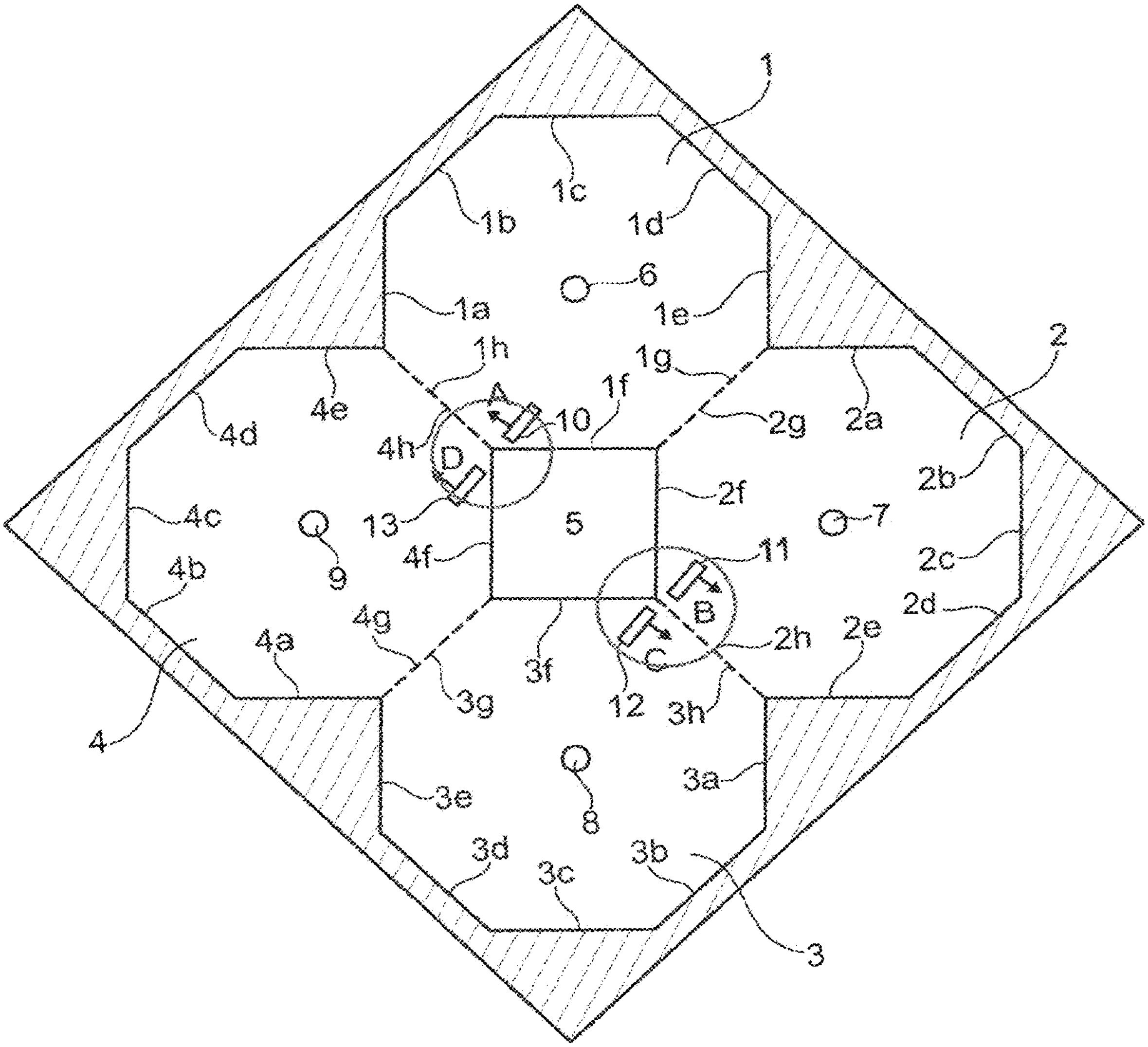
FIG. 2 shows a plan view of aquaculture system according to the invention.
Figure 3:
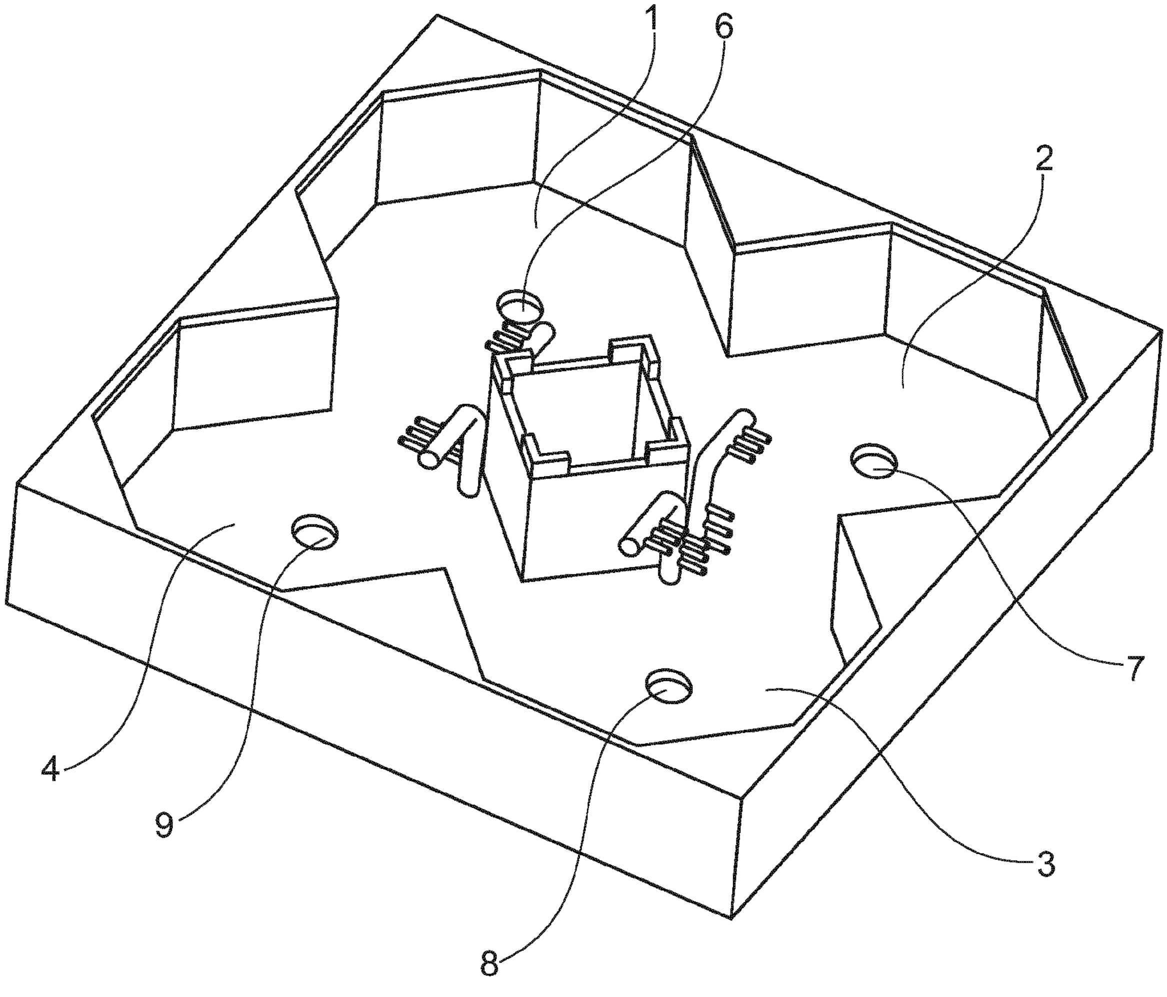
FIG. 3 shows a perspective view of the aquaculture system shown in FIG. 2 according to the invention.

FIG. 2 and FIG. 3 show an aquaculture containment according to the invention. The aquaculture system has four cells (1, 2, 3, 4) which, together form the containment of the aquaculture system. The cells (1-4) are each octagonal in shape and defined by walls (1-4*a*, 1-4*b*, 1-4*c*, 1-4*d*, 1-4*e*) and by weirs or further walls (1*f*, 2*f*, 3*f* and 4*f*) of central structure (5). In an example, peripheral walls can include walls (1-4*b*, 1-4*c*, and 1-4*d*) and internal walls can include walls (1-4*a* and 1-4*e*). Boundary (1*g*-2*g*) defines a part of the octagonal shape of cells (1) and (2) which are in fluid communication. Boundaries (2*h*-3*h*), (3*g*-4*g*) and (4*h*-1*h*) respectively define the fluid communication boundaries between cells (2 and 3), cells (3 and 4) and cells (4 and 1), respectively.

The containment holds a body of water in the four cells and the body of water in each cell is rotatable with the octagonal volume defined by the cell whereby less than 10% and suitably less than 1% of the body of water in one given cell flows into an adjacent cell. The body of water in each cell is, to a large extent and in effect, isolated from the body of water in adjacent cells with minimal mixing or transfer of water across the fluid communication boundaries between adjacent cells.

Each cell has an inlet (10, 11, 12, 13) for inflow of water to the cell. The inflow is directional so as to provide impetus for rotation of the body of water in the cell. Inlet (10) of cell (1) is arranged so as to expel water into the cell in the direction A. This creates a rotational flow of water in cell (1) in a clockwise direction. Similarly, inlets (11-13) respectively provide a directional flow of water into, respectively, cells (2-4) in respective directions B, (anticlockwise rotation of water in cell (2)), C (clockwise rotation of water in cell (3)) and D (anticlockwise rotation in cell (4)). The body of water in each of the cells (1-4) rotates in a direction such that the flow in adjacent cells at the boundary between those cells is generally in a co-current, parallel path so as to minimise transferal of water across the boundary into the adjacent cell.

Figure 6:
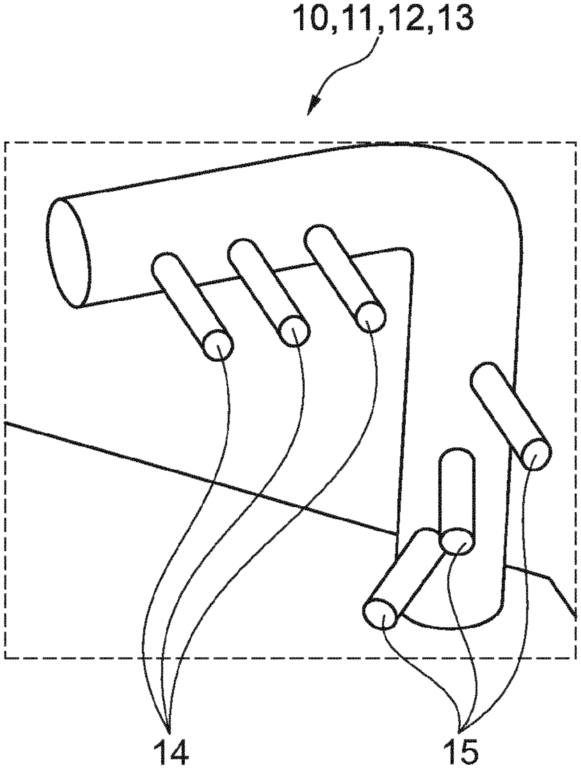
FIG. 6 shows a perspective view of an inlet suitable for use in the aquaculture system according to the invention.

The inlets (10-13) may be of any suitable arrangement to provide directional flow of water. An example of a suitable inlet with multiple nozzles is shown in FIG. 6. The inlets are all suitably supplied by a common water supply infrastructure to reduce the area or footprint required for the aquaculture system as compared to that required for a conventional system having the same volume of water within the containment.

The central structure (5) defines a part of each cell by providing a barrier wall (1*f*, 2*f*, 3*f*, 4*f*). These walls are suitably at a lower height than the intended surface of the water in use such that the walls (1*f*-4*f*) act as weirs, one for each cell, allowing water to be removed from the containment to balance the inflow and outflow of water. Suitably at least 50% and especially at least 90% of the total water outflow occurs via the weirs (1*f*-4*f*).

Each cell also has an outlet aperture (6, 7, 8, 9) respectively for removal of solid waste and other material from the cells (1-4). A proportion of water also passes through these outlets, suitably less than 10% based on the total volume of water.

Any number of cells may be included in the containment and suitably are arranged in a close packed configuration. The cells shown in FIG. 2 are arranged in a 2×2 configuration. As desired, other arrangements for example 3×3, 2×4 or arrangements with higher numbers of cells may be adopted provided that each cell is in fluid communication with adjacent cells and means are provided for each cell to receive water and an outlet for water and waste.

Figure 4:
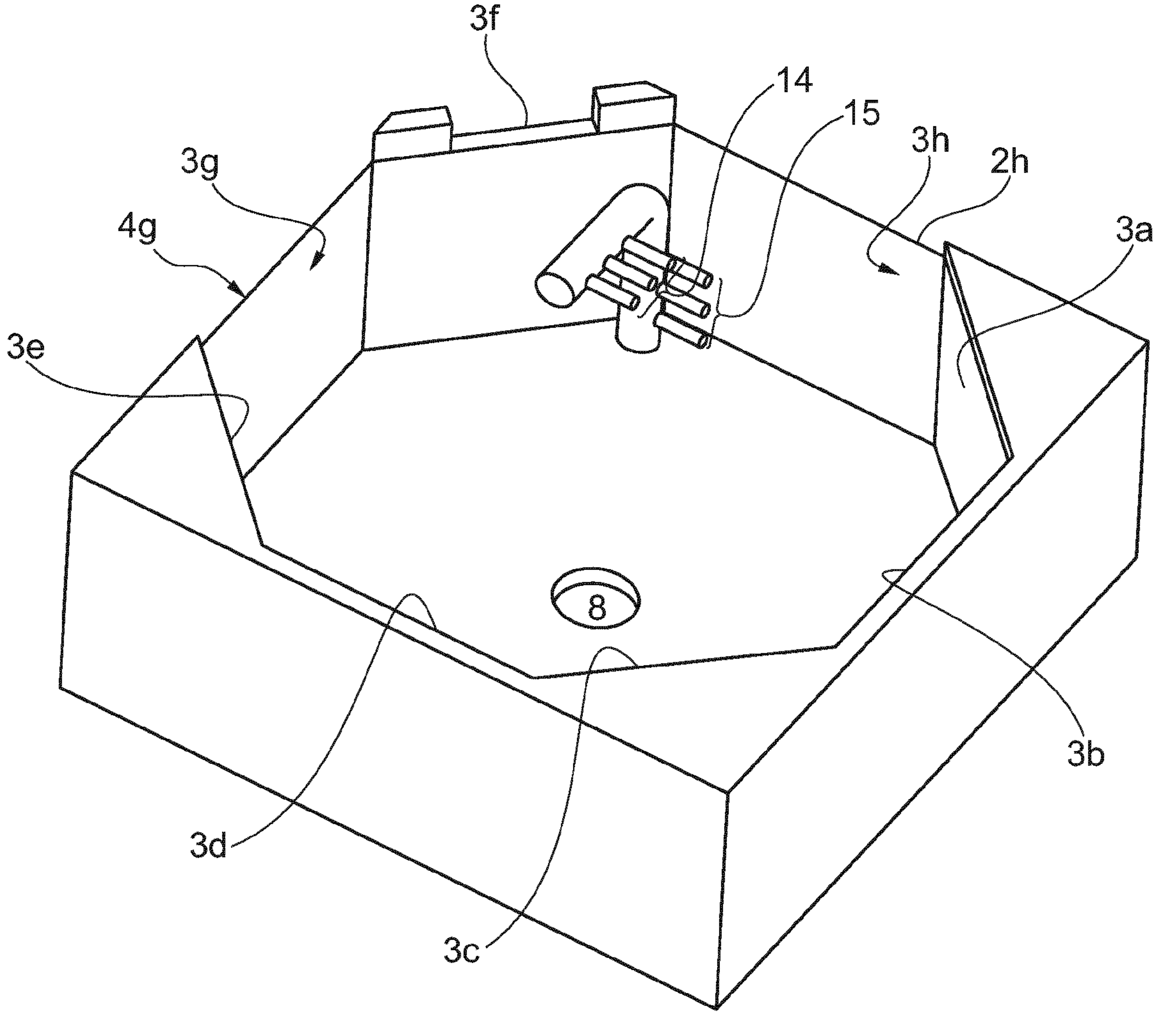
FIG. 4 shows a perspective view of one cell of the aquaculture system shown in FIGS. 2 and 3, according to the invention.

FIG. 4 shows the one cell (3) of the aquaculture system shown in FIGS. 2 and 3 with a more detailed representation of the inlet (120 comprising nozzles (14, 15) arranged horizontally (14) and vertically (15) in the same general direction so as to impart a force to the body of water which then rotates within the cell. The cell is defined by walls (3*a*-3*e*0, weir (3*f*) and boundaries (2*h*-3*h*) and (3*g*-4*g*). The water rotates in a clockwise direction in this cell (3) by virtue of the position of the inlet (12). Weir (3*f*) is bounded by raised parts (3*j* and 3*k*) and is at a height lower than the intended water-level in use such that a proportion of the water flows out of the cell over the weir.

Figure 5:
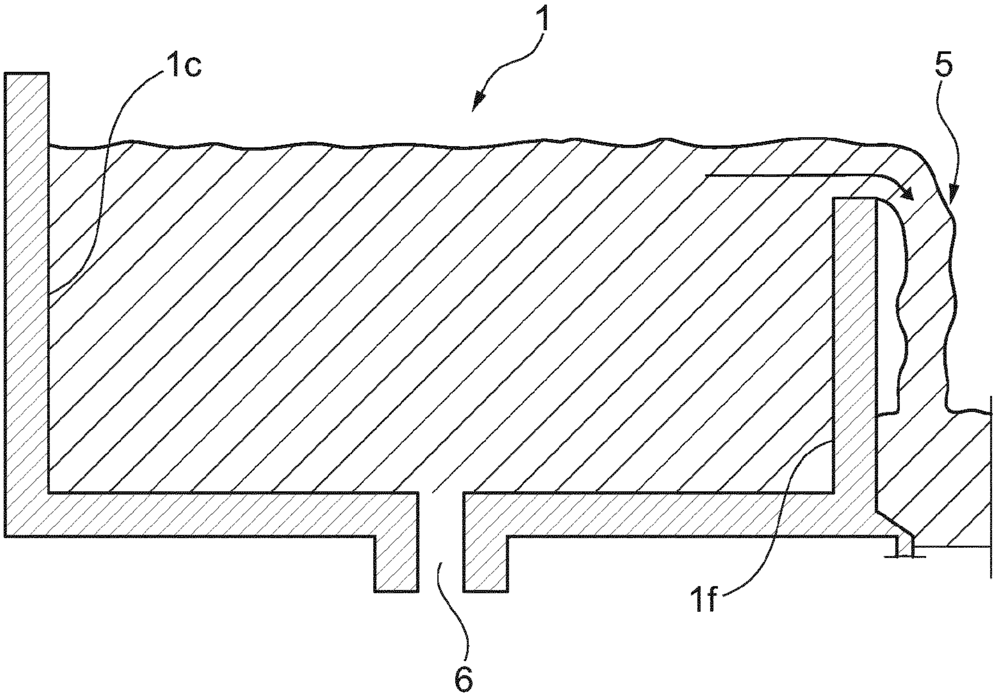
FIG. 5 shows a section in a vertical plane of one cell of the aquaculture system shown in FIGS. 2 and 3, according to the invention.

FIG. 5 shows a cross-section of a cell (1) with outside wall (1*c*) and weir (1*f*). Water is shown draining over the weir (in direction F) into central structure (5). Solid waste and a proportion of the water passes out of the cell (1) via outlet (6) in direction E. By adjusting the inflow of water and the level of water in the containment, the rate of outflow may be controlled and hence the residence time of the water in the cell.

FIG. 6 shows an inlet (10-13) which has nozzles (14) arranged in a horizontal plane and nozzles (15) arranged vertically and which have an angular offset relative to the adjacent nozzle of 22.5°.

The invention claimed is:

1. An aquaculture system for supporting aquatic organisms comprising:

a containment for retaining a body of water to provide habitat for the aquatic organisms and comprising, a base, a peripheral side wall and internal walls located so as to define a plurality of cells within the containment wherein each cell is defined by a portion of the peripheral wall, two internal walls extending from the peripheral wall towards the inner area of the containment, and a further wall which extends to the two internal walls with a space between the further wall and the internal walls, each cell being configured to hold a body of water which is rotatable within the cell, each cell being in fluid communication with an adjacent cell in the containment to permit passage of the aquatic organisms between the adjacent cells;

at least one inlet for receiving water into each cell configured to allow the body of water in that cell to be rotatable;

at least one waste outlet in each cell for removing waste from the aquatic organisms; and a water outlet for removing water directly from at least two cells in the containment, wherein the water outlet is located at the periphery of the at least two cells thereby to remove water directly from each of the at least two cells.

2. The aquaculture system according to claim 1 wherein the containment comprises at least 3 cells.

3. The aquaculture system according to claim 1 wherein each cell is shaped such that a body of water in the cell is rotatable within the cell, wherein at least one of the internal walls comprises at least one space to enable fluid communication with an adjacent cell.

4. The aquaculture system according to claim 3 wherein the further wall for each cell is provided by a structure located generally in the center of the containment.

5. The aquaculture system according to claim 4 wherein the structure comprises the water outlet.

6. The aquaculture system according to claim 4 wherein the structure comprises a weir for the removal of water from each cell.

7. The aquaculture system according to claim 1 comprising 4 cells wherein the cells are arranged such that the cells are in a generally square arrangement.

8. The aquaculture system according to claim 7 wherein the cells peripheral wall for each cell is generally of constant radius whereby the containment has a generally quatrefoil shape.

9. The aquaculture system according to claim 1 wherein the inlet for each cell is located so as to enable rotation of the body of water in that cell at a rate and direction substantially independently of the rate and direction of the body of water in the other cells.

10. The aquaculture system according to claim 1 wherein less than 10% of the body of water within a cell transfers to an adjacent cell.

11. The aquaculture system according to claim 1 wherein the containment has one dimension of at least 35 m.

12. The aquaculture system according to claim 1 wherein the inlets are located such that the body of water in a cell is rotatable in the opposite direction to the body of water in an adjacent cell.

13. A method of farming an aquatic organisms in an aquaculture system comprising:

i) providing an aquaculture system for farming aquatic organisms, comprising:

a containment containing a body of water comprising a base, a peripheral side wall and internal walls located so as to define a plurality of cells within the containment wherein each cell is defined by a portion of the peripheral wall, two internal walls extending from the peripheral wall towards the inner area of the containment, and a further wall which extends to the two internal walls with a space between the further wall and the internal walls, each cell holding a portion of the body of water and each cell being in fluid communication with an adjacent cell in the containment to permit passage of the aquatic organisms between the adjacent cells;

at least one inlet for introducing water into each cell;

at least one waste outlet in each cell for removing waste from the aquatic organisms; and a water outlet for removing water directly from at least two cells in the containment, wherein the water outlet is located at the periphery of the at least two cells thereby to remove water directly from each of the at least two cells;

ii) rotating the body of water in each cell in a horizontal plane at a pre-determined angular velocity suitable for the aquatic organisms;

iii) providing feed for the aquatic organisms; and iv) removing waste from each cell via the outlet in that cell.

14. The method according to claim 13 comprises controlling the flow rate of water to the cells such that the velocity of the rotatable water is from 1.5 to 2.5 times the body length of the aquatic organisms per second.

15. The aquaculture system according to claim 1, wherein each cell is of a generally circular, polygonal or part circular, part polygonal shape.

16. The aquaculture system according to claim 6, wherein the weir comprises a dam to permit flow of water from each of the cells into the structure.

17. The aquaculture system according to claim 1, wherein the inlet comprises a plurality of nozzles or slots.

18. The aquaculture system according to claim 17 wherein the inlet in each cell comprises a plurality of nozzles located at or near one or more of the cell walls and aligned to provide a flow of water into the cell in a circumferential direction thereby to impart force to rotate the body of water in the cell.

19. The aquaculture system according to claim 17 wherein the inlet comprises a plurality of nozzles aligned in a horizontal array and/or a vertical array.

20. The aquaculture system according to claim 18 comprising at least 3 nozzles wherein the nozzles are independently arranged at an angle of 0 to 45° relative to the cell wall adjacent to the nozzle.

* * * * *